United States Patent [19]

Inoue

[11] 4,063,262
[45] Dec. 13, 1977

[54] SHUTTER BLADE ASSEMBLY FOR FOCAL PLANE SHUTTERS

[75] Inventor: Nobuyoshi Inoue, Kawagoe, Japan

[73] Assignee: Copal Company Limited, Japan

[21] Appl. No.: 683,202

[22] Filed: May 4, 1976

[30] Foreign Application Priority Data

May 12, 1975 Japan .................................. 50-63347

[51] Int. Cl.² ............................................... G03B 9/20
[52] U.S. Cl. .................................................. 354/246
[58] Field of Search .............................. 354/245–248, 354/261

[56] References Cited

U.S. PATENT DOCUMENTS

| 3,628,438 | 12/1971 | Loseries | 354/246 |
| 3,903,539 | 9/1975 | Kitai et al. | 354/246 |

Primary Examiner—Donald A. Griffin
Attorney, Agent, or Firm—Cushman, Darby & Cushman

[57] ABSTRACT

A shutter blade assembly wherein, in order to make the dimension of the focal plane shutter as small as possible, particularly in the vertical direction, a substantially rectangular main shutter blade for forming an exposure slit is pivotally connected at an end edge portion, located on the side of the shutter, to the ends of a pair of arms which are pivoted at their opposite ends to one side of an exposure aperture. The dimension in the vertical direction of the end edge portion is made larger than the dimension in the vertical direction of the remainder of the shutter blade. A plurality of auxiliary shutter blades for covering the exposure aperture are supported by being respectively pivoted at end edge portions to the arms adjacent the points of pivoting of the main shutter blade to the pair of arms.

2 Claims, 2 Drawing Figures

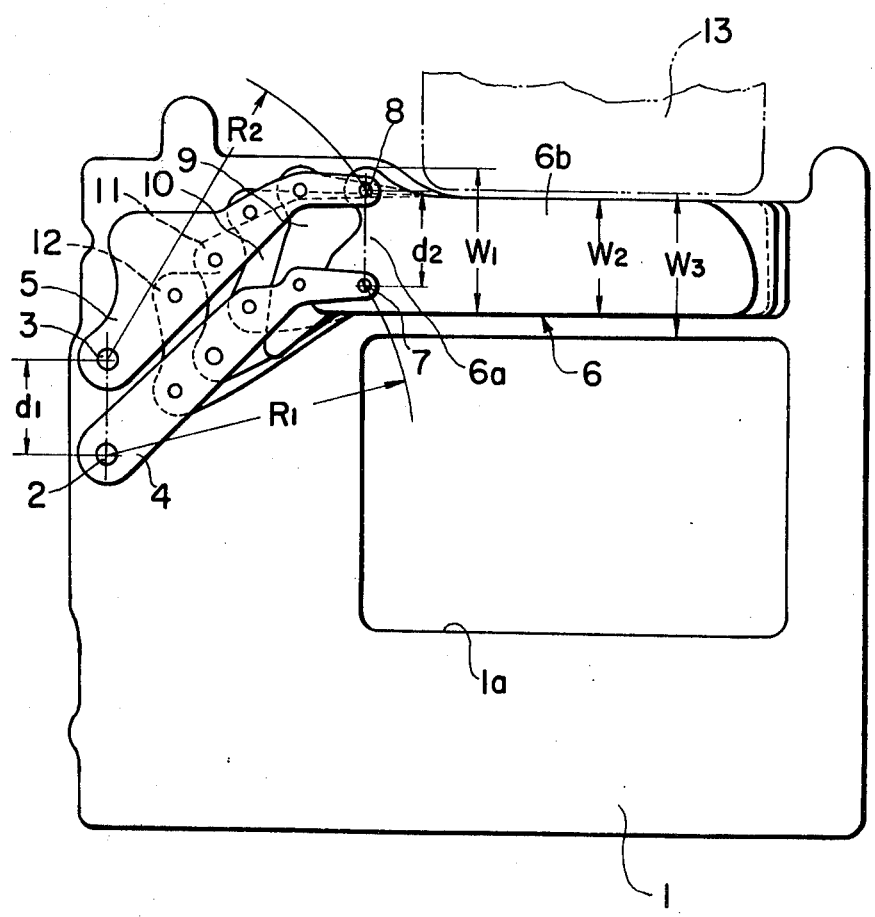

SHUTTER BLADE ASSEMBLY FOR FOCAL PLANE SHUTTERS

BACKGROUND OF THE INVENTION a. Field of the Invention

The present invention relates to a shutter blade assembly for focal plane shutters of a type using shutter blades.

b. Description of the Prior Art

Generally, a focal plane shutter of a type using shutter blades is constituted as follows. That is to say, a pair of arms of the same length are each pivoted at one end in a spaced relationship to a shutter plate having an exposure aperture. A shutter blade for forming an exposure slit is pivoted to the respective other ends of these arms so that a parallelogram link mechanism is formed by the pair of arms and the shutter blade. Accordingly the exposing operation is made by parallelly moving the shutter blade with respect to the exposure aperture.

In the focal plane shutter of this type, if the distance separating the arms of the pair, that is, the distance between the respective pivoting points is too short, when the shutter blade moves, an undesirable backlash or fluctuation is likely to occur. Therefore, the separating distance of the arms of the pair can not be shortened excessively. Therefore a camera equipped with this type of focal plane shutter is comparatively large, particularly when a single-lens reflex camera using a pentaprism is equipped with this kind of focal plane shutter. In such a case, the dimension in the vertical direction is remarkably large.

SUMMARY OF THE INVENTION

Therefore, an object of the present invention is to provide a shutter blade assembly for focal plane shutters of this kind wherein the dimension in the vertical direction in particular can be made small without making short the distance separating a pair of arms supporting the blade assembly.

According to the present invention, this object is, attained by pivoting one end of each of the pair of arms to the shutter blade which forms an exposure slit at an end edge portion of the blade near the side of the exposure aperture to which the opposite ends of the arms are pivoted, and making the width of the remainder of the shutter blade smaller than the width of the end edge portion.

Another object of the present invention is to provide a shutter blade assembly in which the operating motion of the shutter blade is stabilized wherein the assembly can be manufactured at a very low cost.

These and other objects of the present invention will become more apparent during the course of the following detailed of the invention and in the appended claims.

BRIEF DESCRIPTION OF THE DRAWING

The drawing is an elevational view of the essential parts of a preferred embodiment of a shutter blade assembly according to the present invention.

DETAILED DESCRIPTION OF THE PREFERRED EMBODIMENT

In the drawing, reference numeral 1 denotes a shutter plate having a rectangular exposure aperture 1a in which the length of the side in the vertical direction is shorter than the length of the side in the horizontal direction. Numerals 2 and 3 denote pivots provided on the shutter plate 1 at a spacing $d_1$. Numerals 4 and 5 denote a pair of arms pivoted respectively at one of their ends to the shutter plate 1 through pivots 2 and 3, and numeral 6 denotes a substantially rectangular shutter blade for forming an exposure slit which is pivoted respectively to the other ends of the arms 4 and 5 through pivots 7 and 8. These pivots are located at an end edge portion 6a of blade 6 on the side near the pivots 2 and 3. Preferably, the distance $d_2$ between the pivots 7 and 8 is equal to the distance $d_1$ between the pivots 2 and 3, and the distance $R_1$ between the pivots 2 and 7 is equal to the distance $R_2$ between the pivots 3 and 8. Accordingly, the pair of arms 4 and 5 and the shutter blade 6 form a parallelogram link mechanism. As a result, when the arms 4 and 5 of the pair are rotated clockwise from the illustrated position, the shutter blade 6 will be moved downward to partly cover the exposure aperture 1a with the lower side remaining parallel with the longer sides of the exposure aperture 1a. The width $W_1$ in the vertical direction of the end edge portion 6a of the shutter blade 6 is larger than the width $W_2$ in the vertical direction of the other portion 6b of the shutter blade 6 so as to be able to provide to the distance $d_2$ between the pivots 7 and 8, and therefore the distance $d_1$ between the pivots 2 and 3, necessary to secure stable operation of the shutter blade 6. Further, as evident from the drawing, the lengths of the arms 4 and 5 are so selected that the end edge portion 6a of the shutter blade 6 and, the pivoting points 7 and 8 of the arms 4 and 5 are positioned near the side of the exposure aperture 1a adjacent pivots 2 and 3.

Reference numerals 9, 10, 11 and 12 denote auxiliary shutter blades respectively pivoted to the pair of arms 4 and 5 in the same manner as shutter blade 6. When the arms 4 and 5 of the pair are rotated clockwise in a predetermined range from the illustrated position, the auxiliary shutter blades 9, 10, 11 and 12 together with shutter blade 6 serve to fully cover the exposure aperture 1a. Numeral 13 denotes a finder device arranged on the shutter plate 1 above the exposure aperture 1a.

Usually, a focal plane shutter of a type using shutter blades is formed by providing two shutter blade assemblies each consisting of the above described pair of arms 4 and 5 and shutter blades 6, 9, 10, 11 and 12. However, in the present description in order to make the drawing easy to understand, the other shutter blade assembly is omitted.

The operation of the above mentioned apparatus will now be explained.

When the arm 5 is rotated clockwise by a driving mechanism not illustrated, the arm 4 will also rotate clockwise with it and the shutter blade 6 will lower while keeping the attitude illustrated until it reaches the lower side of the exposure aperture 1a. Simultaneously, the auxiliary shutter blades 9, 10, 11 and 12 will also lower in the same manner. However, as the distances from the pivots 2 and 3 to the pivoting points of the respective auxiliary blades become successively smaller than the distances $R_1$ and $R_2$ to the pivoting points of the shutter blade 6, the displacements of the other shutter blades 9, 10, 11 and 12 will be smaller than that of the shutter blade 6. Therefore, when the shutter blade 6 covers the lower portion of the exposure aperture 1a, the other shutter blades 9, 10, 11 and 12 cover the remaining portion of the exposure aperture 1a and the exposure aperture 1a is completely covered by the shutter blades 6, 9, 10, 11 and 12. Therefore, when two of the above described shutter blade assemblies are provided so that one of them is a front blade group and the other is a rear blade group, the exposure aperture 1a is opened and closed.

As evident from the above explanation, according to the present invention, even if the substantial width $W_2$ of the shutter blade 6 for forming the exposure slit is reduced as required, the distance $d_2$ between the pivoting points 7 and 8 of the arms 4 and 5 can be selected to optimize the shutter operation in respect of the lengths of the arms 4 and 5 or the distances $R_1$ and $R_2$. Therefore, the distance $W_3$ from the upper side of the exposure aperture 1a to the lower side of the finder device 13 is made so small that, even in case a focal plane shutter of a shutter blade type is used, it is possible to design a camera having a small dimension in the vertical direction. Furthermore, for the above described reasons, this kind of shutter device, which is very stable in the operation and high in the performance, can be provided at a low cost.

The auxiliary shutter blades 9, 10, 11 and 12 are pivoted to the pair of arms 4 and 5 in the same manner as the shutter blade 6 for forming the exposure slit in the above described embodiment. However, they can be modified to be of a type to cover the exposure aperture 1a by expanding while rotating from folded state in relation to the movement of the arms.

I claim:

1. A shutter blade assembly for focal plane shutters comprising a shutter plate having an exposure aperture therein, a finder device arranged on the shutter plate in spaced relationship with the upper edge of said aperture, a pair of arms each respectively pivoted at one of its ends to spaced locations on said shutter plate at one side of the exposure aperture, and a shutter blade for forming an exposure slit, said blade comprising an end edge portion and a remaining portion having a width which is smaller than the edge portion and less than the space between the finder device and the upper edge of the aperture, said edge portion of the shutter blade being pivotally connected at separate points to the other ends of said arms, the edge portion being positioned proximate said one side of the exposure aperture whereby when the shutter blade is positioned such that said remaining portion occupies the space between the finder and the upper edge of the aperture, the end edge portion is disposed to one side of the finder device.

2. A shutter blade assembly as set forth in claim 1, wherein the shutter blade further comprises a plurality of auxiliary blades each having substantially the same shape as the first-mentioned blade and each being pivotally connected at its respective end edge portion to said arms at spaced intervals between the ends of the arms.

* * * * *

Notice of Adverse Decision in Interference

In Interference No. 100,224, involving Patent No. 4,063,262, N. Inoue, SHUTTER BLADE ASSEMBLY FOR FOCAL PLANE SHUTTERS, final judgment adverse to the patentee was rendered Mar. 28, 1980, as to claims 1 and 2.

[*Official Gazette June 10, 1980.*]